United States Patent
Lee

(10) Patent No.: US 10,522,814 B2
(45) Date of Patent: Dec. 31, 2019

(54) BATTERY EXPLOSION PREVENTION APPARATUS, BATTERY PACK, AND METHOD FOR OPERATING THE SAME

(71) Applicant: LG CHEM, LTD., Seoul (KR)

(72) Inventor: Jun Ho Lee, Chungcheongbuk-Do (KR)

(73) Assignee: LG Chem, Ltd., Seoul (KR)

( * ) Notice: Subject to any disclaimer, the term of this patent is extended or adjusted under 35 U.S.C. 154(b) by 19 days.

(21) Appl. No.: 15/942,775

(22) Filed: Apr. 2, 2018

(65) Prior Publication Data

US 2018/0323420 A1 Nov. 8, 2018

(30) Foreign Application Priority Data

May 8, 2017 (KR) .................. 10-2017-0057460

(51) Int. Cl.
*H01M 2/36* (2006.01)
*H01M 2/10* (2006.01)
*H01M 10/42* (2006.01)
*H01M 10/48* (2006.01)

(52) U.S. Cl.
CPC ......... *H01M 2/364* (2013.01); *H01M 2/1077* (2013.01); *H01M 10/425* (2013.01); *H01M 10/4257* (2013.01); *H01M 10/486* (2013.01); *H01M 2010/4271* (2013.01); *H01M 2200/10* (2013.01); *H01M 2220/20* (2013.01)

(58) Field of Classification Search
None
See application file for complete search history.

(56) References Cited

U.S. PATENT DOCUMENTS

2010/0247980 A1* 9/2010 Jang .................. H01M 2/34
429/10

* cited by examiner

*Primary Examiner* — Wyatt P McConnell
(74) *Attorney, Agent, or Firm* — Morgan, Lewis & Bockius LLP

(57) ABSTRACT

Provided are a battery explosion prevention apparatus including a battery holder which is installed and fixed to a circumference of a battery module constituted by a plurality of secondary battery cells and on which at least one or more electromagnets are disposed on a lower portion thereof at a predetermined interval and a movable frame which has an opened one side to provide an insertion space into which the battery module is inserted and on which a plurality of punching needles are disposed on a bottom surface of the insertion space, and a battery pack including the battery module.

12 Claims, 3 Drawing Sheets

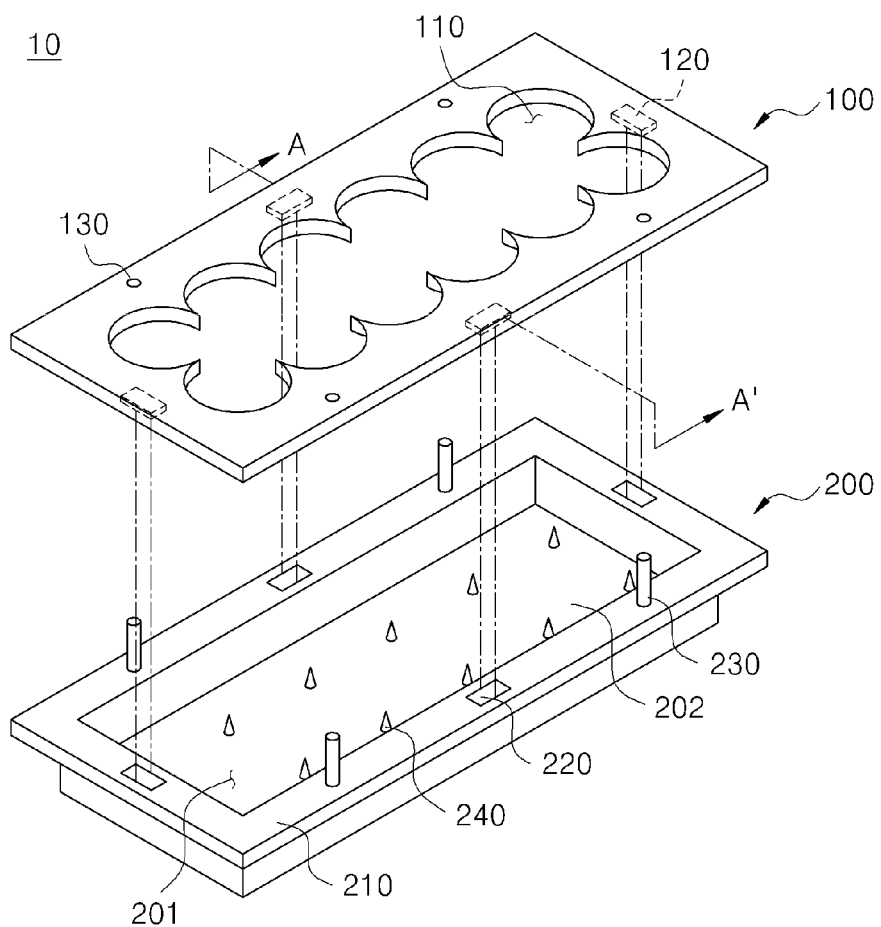
[FIG. 1]

[FIG. 2]
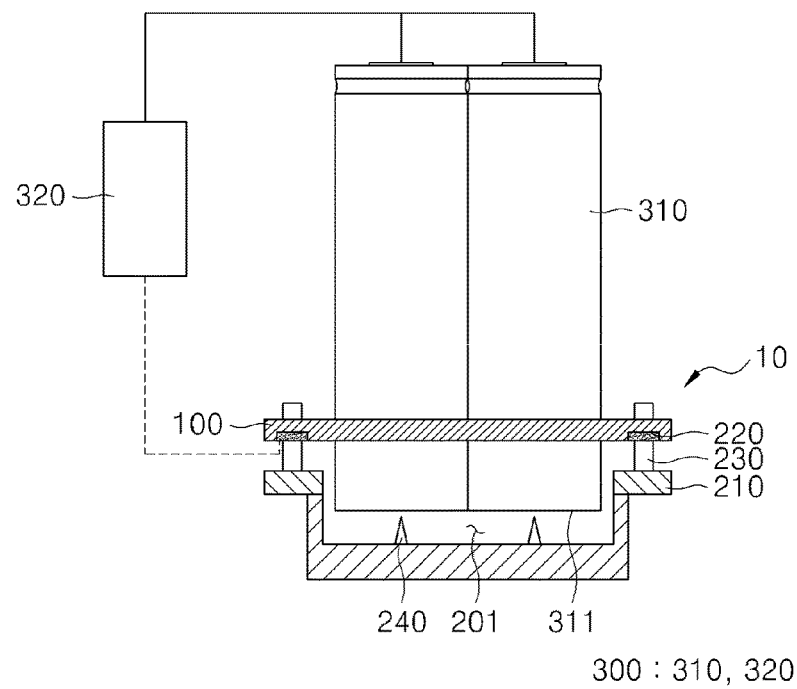
[FIG. 3]
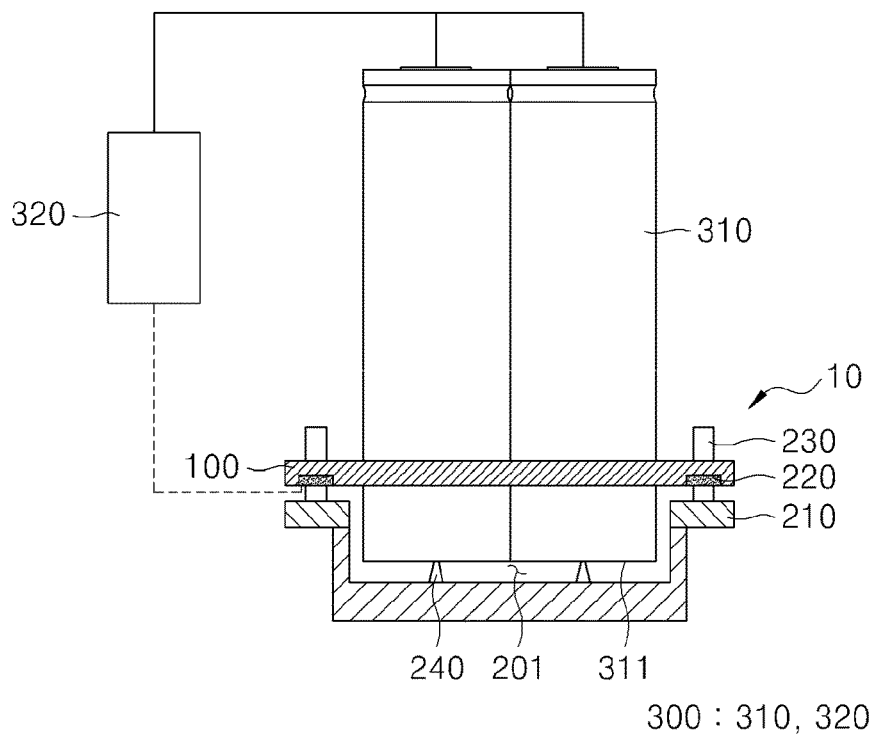

[FIG. 4]
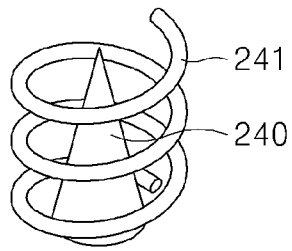
[FIG. 5]
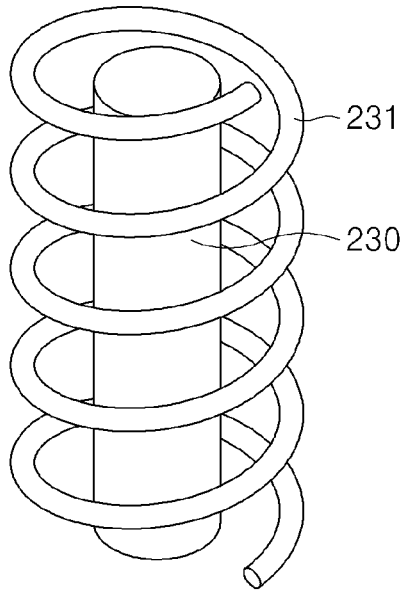
[FIG. 6]
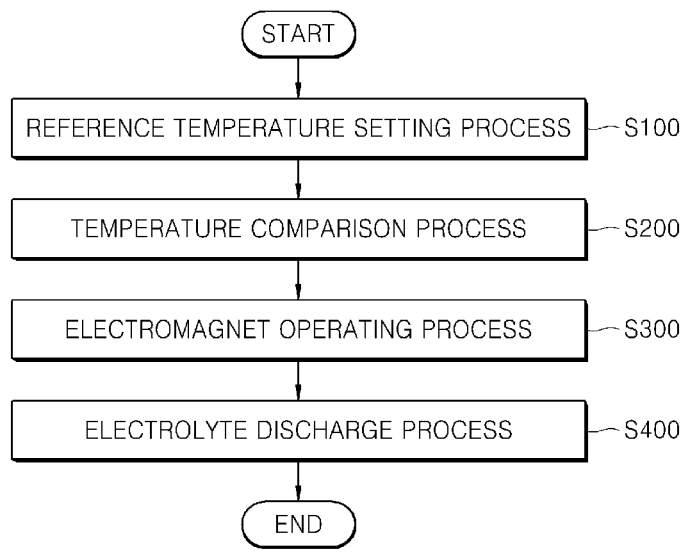

BATTERY EXPLOSION PREVENTION APPARATUS, BATTERY PACK, AND METHOD FOR OPERATING THE SAME

CROSS-REFERENCE TO RELATED APPLICATION

This application claims priority to Korean Patent Application No. 10-2017-0057460 filed on May 8, 2017 and all the benefits accruing therefrom under 35 U.S.C. § 119, the contents of which are incorporated by reference in their entirety.

BACKGROUND

The present disclosure relates to a battery explosion prevention apparatus, a battery pack, and a method for operating the same, and more particularly, to a battery explosion prevention apparatus, in which a secondary battery cell is punched to discharge an electrolyte therein when a temperature of the secondary battery cell is detected to a temperature greater than a set critical temperature, a battery pack, and a method for operating the same.

In recent years, as technical development and demand on electric vehicles, hybrid vehicles, power storage devices, and uninterruptible power supplies increase, demand of secondary batteries as energy sources is rapidly increasing. Particularly, battery packs used in electric vehicles or hybrid vehicles are high-output large-capacity secondary batteries, and many studies on the battery packs are being conducted.

Particularly, since lithium secondary batteries have higher energy density per unit weight and are quickly chargeable when compared to different kinds of existing secondary batteries such as lead-acid batteries, nickel-cadmium batteries, nickel-hydrogen batteries, nickel-zinc batteries, and the like, the increase in use thereof is actively proceeding.

Such a lithium secondary battery has an operating voltage of 3.6V or more and may be used as power sources for portable electronic devices or used for electric vehicles, hybrid vehicles, power tools, electric bicycles, power storage devices, uninterruptible power supplies, and the like, in which a plurality of batteries are connected in series or in parallel to each other, and high output is required.

When power is generated from the battery pack, heat is generated due to electrochemical reaction. Here, if the heat remains in the cell within the battery pack, the cell increases in temperature to deteriorate operation conditions of the cell and thereby to deteriorate power generation efficiency, as well as, an internal pressure of the sealed pack increases by the generated heat to increase in a risk of explosion. Thus, it is one of the important tasks to secure safety.

In accordance with the related art, a method for forcibly cutting off the power to prevent the battery pack from being exploded by an increase in temperature due to the use of the battery pack has been used. Although this method prevents the temperature of the battery pack from increasing no longer by immediately cutting off the power, there has been a limitation that the temperature remaining in the battery pack has a possibility of the explosion of the battery pack.

SUMMARY

The present disclosure provides a battery explosion prevention apparatus for preventing a battery pack from being exploded, in which a secondary battery cell constituting the battery pack is punched to discharge an electrolyte therein when a temperature of the battery pack is detected to a temperature greater than a set temperature so as to prevent the battery pack from being exploded and thereby to remove a fundamental cause of the heat generation so that instantaneous temperature drop is induced to previously prevent the battery pack from being exploded by a high temperature, and a battery pack.

In accordance with an exemplary embodiment, a battery explosion prevention apparatus includes: a battery holder which is installed and fixed to a circumference of a battery module constituted by a plurality of secondary battery cells and on which at least one or more electromagnets are disposed on a lower portion thereof at a predetermined interval; and a movable frame which has an opened one side to provide an insertion space into which the battery module is inserted and on which a plurality of punching needles are disposed on a bottom surface of the insertion space.

The battery holder may attract the movable frame by magnetic force due to an operation of the electromagnets.

The battery holder may have at least one or more guide holes in a direction of the movable frame.

The movable frame may further include a contact part corresponding to a bottom surface of the battery holder around the insertion space.

The movable frame may include a metal plate on the contact part to correspond to each of the electromagnets.

At least one or more guide bars may protrude from the contact part to pass through the guide hole of the battery holder so that the movable fame slidably moves.

The punching needle may be disposed to correspond to a bottom surface of each of the secondary battery cells constituting the battery module inserted into the insertion space so that the punching needle is directed to a center of the bottom surface of the secondary battery cells.

The punching needle may punch a bottom surface of each of the secondary battery cells of the battery module inserted into the movable frame in accordance with movement of the movable frame to discharge an electrolyte within the secondary battery cell.

In accordance with another exemplary embodiment, a battery pack includes: a plurality of secondary battery cells; a battery module including a protection circuit module (PCM) configured to control charging/discharging of the secondary battery cells; and a battery explosion prevention apparatus mounted on the battery module.

The PCM may be connected to an electromagnet constituting the battery explosion prevention apparatus to operate the electromagnet when a temperature of the battery module exceeds a set temperature.

In accordance with yet another exemplary embodiment, a method for operating an explosion prevention battery pack includes: a reference temperature setting process of setting an explosion critical temperature of a secondary battery cell to a battery protection circuit module (PCM); a temperature comparison process of comparing a temperature of the secondary battery cell, which is measured in the battery PCM, with the reference temperature; an electromagnet operating process of operating an electromagnet in the battery PCM; and an electrolyte discharge process of punching the secondary battery cell by using a punching needle to discharge an electrolyte within the secondary battery cell.

In the electromagnet operating process, when the temperature of the secondary battery cell, which is measured in the temperature comparison process, exceeds a preset temperature, the battery PCM may operate the electromagnet.

In the electrolyte discharge process, when the electromagnet operates in the electromagnet operating process, a movable frame may slidably move to a battery holder to allow a punching needle disposed in the movable frame to punch a bottom surface of the secondary battery cell so that the electrolyte within the secondary battery cell is discharged.

BRIEF DESCRIPTION OF THE DRAWINGS

Exemplary embodiments can be understood in more detail from the following description taken in conjunction with the accompanying drawings, in which:

FIG. 1 is an exploded perspective view of a battery explosion prevention apparatus in accordance with an exemplary embodiment;

FIG. 2 is a side view of a battery pack on which the battery explosion prevention apparatus is mounted in accordance with an exemplary embodiment;

FIG. 3 is a side view illustrating a state in which the battery explosion prevention apparatus operates to prevent a battery pack from being exploded in accordance with an exemplary embodiment;

FIG. 4 is a view illustrating a configuration in which a spring is applied to a punching needle applied to another exemplary embodiment;

FIG. 5 is a view illustrating a configuration in which the spring is applied to a guide bar applied to further another exemplary embodiment; and FIG. 6 is a flowchart illustrating a method for operating a battery pack in accordance with an exemplary embodiment.

DETAILED DESCRIPTION OF EMBODIMENTS

Terms or words used in the specification and claims should not be construed as limited to a lexical meaning, and should be understood as appropriate notions by the inventor based on that he/she is able to define terms to describe his/her invention in the best way to be seen by others. Therefore, the embodiments described in this specification and the constructions illustrated in the drawings are only preferred embodiments of the present invention, and may not describe the technical spirit thoroughly. Accordingly, it should be understood that various equivalents and modifications which can substitute the embodiments may be provided at a point of application time of this specification. Moreover, detailed descriptions related to well-known functions or configurations will be ruled out in order not to unnecessarily obscure subject matters of the present invention.

FIG. 1 is an exploded perspective view of a battery explosion prevention apparatus in accordance with an exemplary embodiment.

Referring to FIG. 1, a battery explosion prevention apparatus in accordance with an exemplary embodiment includes a battery holder 100 and a movable frame 200.

The battery holder 100 corresponds to an outer appearance of a battery module so as to be installed and fixed to a circumference of the battery module constituted by a plurality of secondary battery cells and has a secondary battery accommodation region 110 vertically passing through the battery holder.

The battery holder 100 is inserted into the accommodation region 110 in a fitting manner and then is fixed to the battery module.

Alternatively, the battery holder may be fixed to the battery module through welding. Thus, an exemplary embodiment is not limited to the fixing method.

At least one or more electromagnets 120 are disposed at a predetermined interval on a circumference of a bottom surface of the battery holder 100.

Although the electromagnets 120 are embedded in the battery holder 100 in FIG. 1, an embodiment is not limited thereto. For example, the electromagnets 120 may be bonded to the bottom surface of the battery holder 100.

Also, when the electromagnets 120 operate, magnetic force is generated to attract a movable frame, which will be described below, through the magnetic force.

At least one or more guide holes 130 that vertically pass through the battery holder 100 are defined in a circumference of the battery holder 100. A guide bar 230 of the movable frame 200, which will be described later, passes through the guide hole 130 so that the movable frame 200 slidably moves.

The movable frame 200 has a hexahedral shape of which has an opened one side so that the battery module is insertable.

Here, although the movable frame 200 has the hexahedral shape in FIG. 1, an exemplary embodiment is not limited thereto. For example, the movable frame 200 may have any shape of which one side is opened so that the battery module is insertable.

Also, the movable frame 200 may include a plurality of punching needles 240 on a bottom surface 202 in an insertion space 201.

The movable frame 200 may further include a contact part 210 on a circumference of the insertion space 201.

The contact part 210 may be disposed outside the opened portion of the movable frame 210 or disposed on an end of the movable frame. Here, the contact part 210 is not limited in shape.

In the contact part 210, at least one metal plate 220 may be disposed on at position corresponding to the electromagnet 120 of the battery holder 100, or the contact part 210 may be provided as a metal plate and then bonded to the movable frame 200.

The number of metal plates 220 may be equal to that of electromagnets 120 disposed on the battery holder 100.

The metal plate 220 is not limited in shape and material, as long as the metal plate 220 is capable of accommodating magnetic force of the electromagnet 120. Also, it is not necessarily to be disposed on the position corresponding to that of the metal plate 220, and also, the metal plate 220 may be inserted into the contact part 210 as well as being disposed on a surface of the contact part 210.

Also, a guide bar 230 is disposed to protrude from the contact part 210 at a position corresponding to a guide hole 130 of the battery holder 100.

The guide bar 230 is inserted to pass through a guide hole 130 of the battery holder 100 so that the movable frame 200 is slidably movable. Here, at least one or more guide bars 230 are provided.

Also, the guide bar 230 has a length greater than a moving distance of the movable frame 200 to prevent the battery holder 100 and the movable frame 200 from being separated from each other by the movement of the movable frame 200.

The punching needle 240 has one end that is disposed on a position facing a center of a bottom surface of the secondary battery cells constituting the battery module inserted into the insertion space 201.

The one end of the punching needle 240 may be disposed to match the center of the bottom surface of the secondary battery cell, thereby preventing cell short from occurring when the punching needle 240 passes through the bottom surface of the secondary battery cell.

Also, the punching needle 240 may punch the bottom surface of the secondary battery cells of the battery module inserted into the movable frame 200 in accordance with the movement of the movable frame 200 by the operation of the electromagnet 120 so that the electrolyte within the secondary battery cell is smoothly discharged.

FIG. 2 is a side view of a battery pack including the battery explosion prevention apparatus, and FIG. 3 is a side view illustrating a state in which the battery explosion prevention apparatus of the battery pack operates to allow the punching needle to pass through the secondary battery cell.

Referring to FIG. 2, the battery pack in accordance with an exemplary embodiment may include a plurality of secondary battery cells 310, a battery module including a protection circuit module (PCM) 320 for controlling charging/discharging of the secondary battery cells, and a battery explosion prevention apparatus 10.

Each of the secondary battery cells 310 may be a can-type cell in which an electrode assembly in which a negative electrode plate and a positive electrode plate are wound with a separator therebetween is accommodated in a cylindrical case.

Although the cylindrical-type secondary battery is described in FIG. 2, an exemplary embodiment is not limited thereto. For example, the secondary battery cell 310 may be a stack-type or folding-type secondary battery, which is generally used.

The PCM 320 measures status information such as a temperature and the like of each of the secondary battery cells 310 constituting the battery module 300 by using sensors (not shown) to control charging/discharging of the battery module 300 and protect the battery module 300 against overcurrent and overvoltage.

Also, the PCM 320 is connected to an electromagnet 120 of the battery explosion prevention apparatus 10.

The PCM 320 measures a temperature of the secondary battery cell 310 through the sensor of the battery module 300 to operate the electromagnet 120 and thereby to generate magnetic fields when the measured temperature exceeds a set reference temperature.

The movable frame 200 of the battery explosion prevention apparatus 10 is slid to move to the battery holder 100 by the generated magnetic fields. Here, a bottom surface 311 of the secondary battery cell 310 is punched by the punching needle 240 disposed on the bottom surface of the movable frame 200.

The battery holder 100 constituting the battery explosion prevention apparatus 10 is fixed and installed on a circumference of the battery module 300.

The battery module may be fixed in the accommodation region of the battery holder 100 in a fitting manner. Alternatively, the battery module 300 and the battery holder 100 may be fixed through welding on a contact area therebetween.

The movable frame 200 constituting the battery explosion prevention apparatus 10 is disposed on a lower portion of the secondary battery cell 310 constituting the battery module 300. Here, the lower portion of the secondary battery cell 310 is disposed to be inserted into the accommodation part 201 of the movable frame 200.

Also, the movable frame 200 is disposed so that one end of the punching needle 240 disposed in the movable frame 200 is spaced a predetermined distance from the bottom surface 311 of the secondary battery cell 310.

Also, the guide bar 230 of the movable fame 200 is installed to pass through the guide hole 130 of the battery holder 100.

FIGS. 4 and 5 illustrate a punching needle and a guide bar applied to another exemplary embodiment.

Referring to FIG. 4, in accordance with another exemplary embodiment, a spring 241 having elasticity is mounted around the punching needle constituting a battery explosion prevention apparatus.

The movable frame 200 is slid by an operation of an electromagnet 120 to allow the punching needle 240 to punch a bottom surface 311 of a secondary battery cell 310. Then, when the operation of the electromagnet 120 is stopped, the punching needle 240 is spaced apart from the secondary battery cell 310 by the elasticity of the spring 241.

Thus, an electrolyte within the secondary battery cell may be more smoothly discharged to the outside through a punched hole generated by the punching needle 240.

Referring to FIG. 5, in accordance with another exemplary embodiment, the feature in which the spring 241 is disposed around the punching needle 240 to punch the bottom surface 311 of the secondary battery cell through the electromagnet 120, and then, the punching needle 240 is spaced apart from the secondary battery cell 310 except that the spring 231 having elasticity is disposed around the guide bar 230 is the same, and thus, detailed description will be omitted.

FIG. 6 is a flowchart illustrating a method for operating a battery pack in accordance with an exemplary embodiment.

A method for operating a battery pack in accordance with an exemplary embodiment includes a reference temperature setting process (S100), a temperature comparison process (S200), an electromagnet operating process (S300), and an electrolyte discharge process (S400).

In the reference temperature setting process (S100), a reference temperature is set to a battery protection circuit module (PCM) of a battery pack in accordance with an exemplary embodiment.

The reference temperature may be calculated through calculation in a process of designing the battery module so as to set an explosion critical temperature at which the battery module may be exploded due to an increase in temperature.

In the temperature comparison process (S200), the reference temperature set in the reference temperature setting process (S100) and an internal temperature of the secondary battery cell, which is measured through a sensor by the battery PCM are compared with each other.

In the electromagnet operating process (S300), when the temperature measured in the temperature comparison process (S200) exceeds the reference temperature, the battery PCM generates magnetic force by an operation of an electromagnet.

In the electrolyte discharge process (S400), when the electromagnet operates in the electromagnet operating process (S300), a movable frame of the battery explosion prevention apparatus slidably moves to allow a punching needle to punch a bottom surface of the secondary battery cell, and thus, an electrolyte within the secondary battery cell is discharged to the outside.

As described above, in the battery explosion prevention apparatus in accordance with an exemplary embodiment, the electrolyte, which is a fundamental cause of explosion due to an increase in temperature of the secondary battery cell while the battery pack operates, may be discharged to the outside to instantaneously reduce the temperature when the temperature exceeds the reference temperature at which the explosion may occur.

As a further embodiment, in the operating method, the operation conditions in the electromagnet operating process (S300) and the electrolyte discharge process (S400) are not limited to the results of the operations S100 and S200. The electromagnet operating process (S300) and the electrolyte discharge process (S400) may be executed under different protection conditions such as a battery circuit short that is determined to require a battery protection operation in the battery PCM.

In accordance with the exemplary embodiment, when the measured temperature of the secondary battery cell exceeds the set reference temperature, the movable frame may move by the magnetic force of the magnet to allow the punching needle to punch the bottom surface of the secondary battery cell and thereby to discharge the electrolyte within the secondary battery cell, thereby immediately reducing the temperature of the secondary battery cell and preventing the secondary battery from being exploded by the increase of the temperature.

Although the battery explosion prevention apparatus, the battery pack, and the method for operating the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A battery explosion prevention apparatus comprising:
   a battery holder which is installed and fixed to a circumference of a battery module constituted by a plurality of secondary battery cells and on which at least one or more electromagnets are disposed on a lower portion thereof at a predetermined interval; and
   a movable frame which has an opened one side to provide an insertion space into which the battery module is inserted, wherein a plurality of punching needles is disposed on a bottom surface of the insertion space.

2. The battery explosion prevention apparatus of claim 1, wherein the battery holder attracts the movable frame by magnetic force due to an operation of the electromagnets.

3. The battery explosion prevention apparatus of claim 1, wherein the battery holder has at least one or more guide holes in a direction of the movable frame.

4. The battery explosion prevention apparatus of claim 3, wherein the movable frame further comprises a contact part corresponding to a bottom surface of the battery holder around the insertion space.

5. The battery explosion prevention apparatus of claim 4, wherein the movable frame comprises a metal plate on the contact part to correspond to each of the electromagnets.

6. The battery explosion prevention apparatus of claim 4, wherein at least one or more guide bars protrude from the contact part to pass through the guide hole of the battery holder so that the movable fame slidably moves.

7. The battery explosion prevention apparatus of claim 1, wherein the punching needle is disposed to correspond to a bottom surface of each of the secondary battery cells constituting the battery module inserted into the insertion space so that the punching needle is directed to a center of the bottom surface of the secondary battery cells.

8. The battery explosion prevention apparatus of claim 1, wherein the punching needle punches a bottom surface of each of the secondary battery cells of the battery module inserted into the movable frame in accordance with movement of the movable frame to discharge an electrolyte within the secondary battery cell.

9. A battery pack, comprising:
   a plurality of secondary battery cells;
   a battery module comprising a protection circuit module (PCM) configured to control charging/discharging of the secondary battery cells; and
   a battery explosion prevention apparatus mounted on the battery module,
   wherein the PCM is connected to an electromagnet constituting the battery explosion prevention apparatus to operate the electromagnet when a temperature of the battery module exceeds a set temperature.

10. A method for operating an explosion prevention battery pack, the method comprising:
    a reference temperature setting process of setting an explosion critical temperature of a secondary battery cell to a battery protection circuit module (PCM);
    a temperature comparison process of comparing a temperature of the secondary battery cell, which is measured in the battery PCM, with the reference temperature;
    an electromagnet operating process of operating an electromagnet in the battery PCM; and
    an electrolyte discharge process of punching the secondary battery cell by using a punching needle to discharge an electrolyte within the secondary battery cell.

11. The method of claim 10, wherein, in the electromagnet operating process, when the temperature of the secondary battery cell, which is measured in the temperature comparison process, exceeds a preset temperature, the battery PCM operates the electromagnet.

12. The method of claim 10, wherein, in the electrolyte discharge process, when the electromagnet operates in the electromagnet operating process, a movable frame slidably moves to a battery holder to allow a punching needle disposed in the movable frame to punch a bottom surface of the secondary battery cell so that the electrolyte within the secondary battery cell is discharged.

* * * * *